(No Model.)
J. L. MEEKS.
CHECK FOR VEHICLE SPRINGS.
No. 432,062. Patented July 15, 1890.
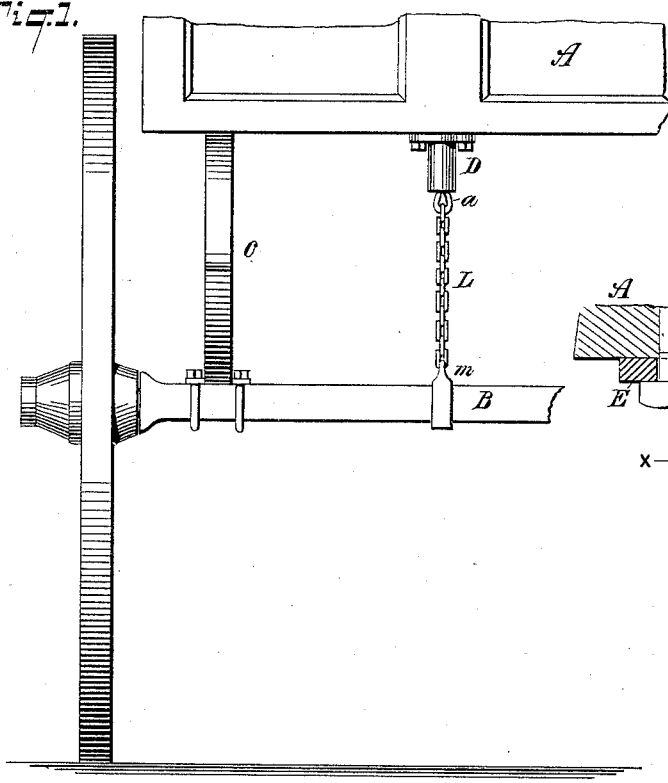
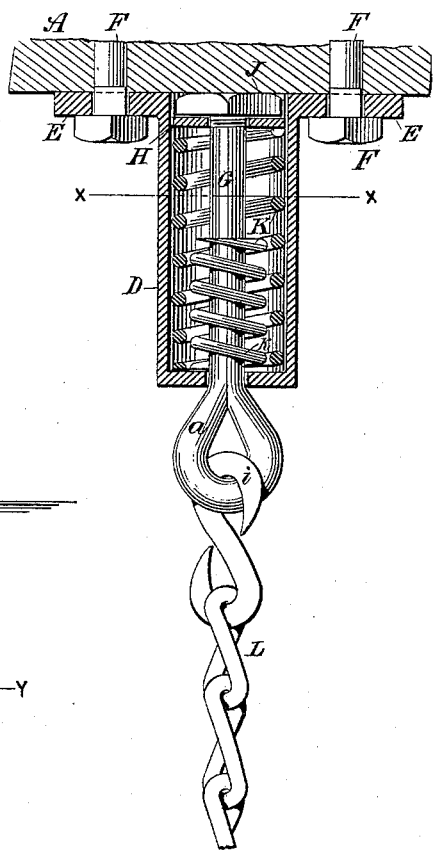
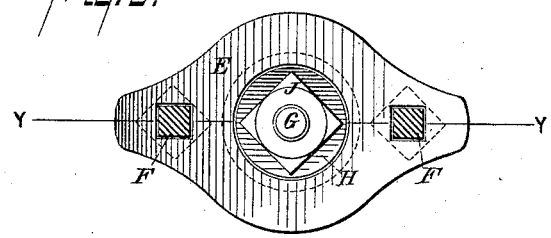
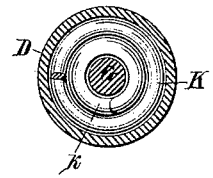
WITNESSES:
Gustave Dieterich.
William Goebel.
INVENTOR
John L. Meeks
BY John F. Foley
ATTORNEY.

UNITED STATES PATENT OFFICE.

JOHN L. MEEKS, OF BROOKLYN, NEW YORK.

CHECK FOR VEHICLE-SPRINGS.

SPECIFICATION forming part of Letters Patent No. 432,062, dated July 15, 1890.

Application filed April 7, 1890. Serial No. 346,878. (No model.)

*To all whom it may concern:*

Be it known that I, JOHN L. MEEKS, a citizen of the United States, and a resident of Brooklyn, in the county of Kings and State of New York, have invented certain new and useful Improvements in Checks for Springs of Vehicles, of which the following is a specification.

The invention relates to improvements in checks for springs of vehicles; and it consists in a device whereby the springs are prevented from becoming unduly expanded when the vehicle passes over an obstruction in the roadway.

It is well understood that springs in use on stage-coaches, express-wagons, and other vehicles are of a sensitive character, and that when the vehicle passes over an obstruction or is moving rapidly or materially jarred the spring will become unduly expanded and liable to break.

By means of my invention I obviate all danger of the springs becoming unduly expanded or breaking; and my invention consists in a spring, the construction and operation of which will be more fully explained hereinafter, which is attached to the under side of the body of a vehicle and connected to the axle by means of a chain, as hereinafter described, and as illustrated in the accompanying drawings, in which—

Figure 1 is a rear view of a portion of a vehicle, showing the invention applied thereto; Fig. 2, a central vertical section of the check, the section being on the dotted line $y\ y$ of Fig. 3, which is a top view of the check; and Fig. 4, a horizontal section on the dotted line $x\ x$ of Fig. 2.

In the drawings, A designates the body of a vehicle mounted on an axle B and having the customary spring C.

D represents a casing having upon its upper end the projecting flange E, containing apertures, through which the bolts F F are passed, by which the casing is secured to the body of the vehicle. In the lower end of the casing D is an aperture, through which the bolt or rod G is inserted, and is permitted to have a vertical movement. The bolt or rod G has secured upon its upper end by means of the nut J a plate H, and upon the lower end of said bolt or rod is formed an eye $a$ for the reception of a hook $i$. Around the bolt or rod G is arranged the coiled spring K and the smaller coiled spring $k$, both springs being capable of creating an upward tension against the plate H, and inclosed by the casing D.

A chain L is secured at its upper end to the eye $a$ of the bolt or rod G, and at its lower end to the axle B by means of the eye $i$.

When the invention is applied to a vehicle, the chain will be drawn taut, so that the plate H may rest close upon the spring K, and hence during the use of the vehicle any undue upward movement in the body thereof, caused by the wheels passing over an obstruction or otherwise, is checked by the chain L and springs K $k$. A definite upward movement is desirable in the body of the vehicle; but when, by the wheels passing over an obstruction, the vehicle is jarred the springs are liable to throw the body upward to such an extent as to cause their fracture, the springs being at such times unduly expanded. It is therefore not the purpose of the present invention to prevent the springs from having a proper action, such as is desired, but to retard such an expansion of the springs as would tend to break them. It will be observed that upon the upward movement of the wagon-body the chain will draw the plate H against and compress the springs K $k$ within the casing D, and thus check the undue action of the vehicle-springs without bringing the vehicle-body to a sudden stoppage, the springs K $k$ partly compressing and checking thereby any undue upward movement in the vehicle-body.

I do not limit myself to the use of both of the springs K $k$, since one of them may be omitted without departing from the spirit of the invention, although I prefer to make use of both of them, since the smaller spring aids in cushioning the plate H at the termination of the upward movement of the vehicle-body. Neither do I limit myself to the employment of a solid cylindrical casing D for containing the springs K $k$, since the sides of said casing may be open, if desired, without impairing the functions of the springs K $k$. When, however, the solid cylindrical casing D is made use of, it will prevent in a large measure the entrance of dust to the springs.

What I claim as my invention, and desire to secure by Letters Patent, is—

1. The check for vehicle-springs hereinbefore described, consisting of the casing secured to the body of the vehicle and inclosing between its upper and lower ends the coiled spring, the lower end of which rests upon the lower end of said casing, combined with the chain secured at its lower end to the axle of the vehicle and carrying at its upper end the rod or bolt, which passes through an aperture in the lower end of said casing and through said spring and has upon its upper end the plate in contact with the upper end of said spring, substantially as set forth.

2. The casing secured to the lower side of the vehicle-body and provided at its upper end with the apertured flange E and at its lower end with a central aperture, combined with the spring K, inclosed within and resting upon the lower end of said casing, the rod or bolt G, passing through said aperture in the lower end of the casing and through said spring and carrying the plate H upon its upper end to rest upon said spring, and the chain L, connected at its upper end with said bolt or rod and at its lower end with the axle of the vehicle, substantially as and for the purposes set forth.

3. The casing rigidly secured to the lower side of the vehicle-body and inclosing the springs K k, one of which is within the other and both of which rest upon the lower end of said casing, combined with the bolt or rod G, passing through an aperture in the lower end of said casing and through said springs and carrying upon its upper end the plate H, and the chain L, connected at its upper end with said bolt and at its lower end with an eye on said axle, substantially as and for the purposes set forth.

Signed at New York, in the county of New York and State of New York, this 5th day of April, A. D. 1890.

JOHN L. MEEKS.

Witnesses:
JOHN F. FOLEY,
FREDK. GIBLIN.